United States Patent
Yuasa et al.

(10) Patent No.: US 7,366,395 B2
(45) Date of Patent: Apr. 29, 2008

(54) MANUFACTURING METHOD OF DIE FOR OPTICAL ELEMENT MOLDING

(75) Inventors: Seiji Yuasa, Hachioji (JP); Shigeru Hosoe, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 236 days.

(21) Appl. No.: 11/090,232

(22) Filed: Mar. 28, 2005

(65) Prior Publication Data

US 2005/0242454 A1 Nov. 3, 2005

(30) Foreign Application Priority Data

Mar. 31, 2004 (JP) ............................. 2004-104251

(51) Int. Cl.
*G02B 6/00* (2006.01)
(52) U.S. Cl. ...................................... 385/147
(58) Field of Classification Search ...................... None
See application file for complete search history.

(56) References Cited

U.S. PATENT DOCUMENTS

| 2002/0117600 A1 | 8/2002 | Hosoe |
| 2002/0118465 A1 | 8/2002 | Hosoe |
| 2004/0211222 A1* | 10/2004 | Hosoe ...................... 65/374.12 |
| 2005/0012020 A1* | 1/2005 | Hosoe .......................... 249/134 |
| 2005/0113230 A1* | 5/2005 | Hirasawa et al. ............. 492/53 |
| 2005/0226955 A1* | 10/2005 | Yuasa et al. ................. 425/406 |

FOREIGN PATENT DOCUMENTS

| EP | 0 567 896 | 11/1993 |
| JP | 7 025628 | 1/1995 |
| JP | 2003-154529 | 5/2003 |
| JP | 2003-160343 | 6/2003 |

* cited by examiner

*Primary Examiner*—Sung Pak
(74) *Attorney, Agent, or Firm*—Finnegan, Henderson, Farabow, Garrett & Dunner, L.L.P.

(57) ABSTRACT

The invention relates to a manufacturing method of a die for molding an optical element. The manufacturing method comprising: forming the first film layer of an amorphous alloy having a super-cooling liquid phase onto a master transfer surface of a master die for molding a molding transfer surface of the die; heating the first film layer more than a glass transition point of the amorphous alloy having the super-cooling liquid phase while a surface of the first film layer and a transferred surface of a base material of the die being faced and pressed; and peeling the first film layer from the master die and transferring the first film layer onto the base material of the die to form the molding transfer surface of the die.

67 Claims, 6 Drawing Sheets

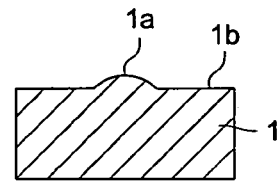
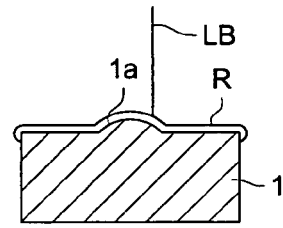
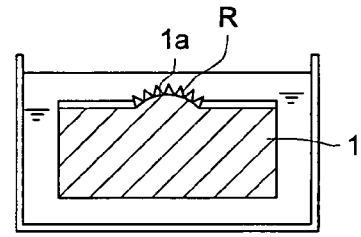
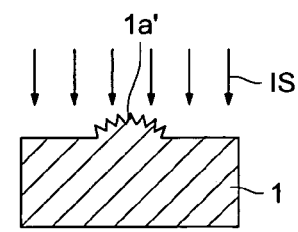
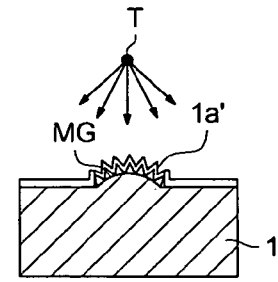
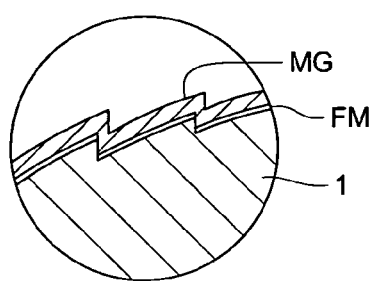
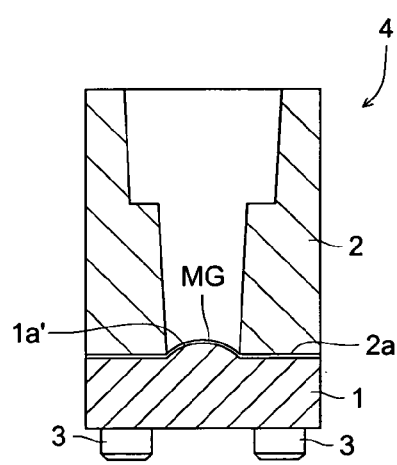
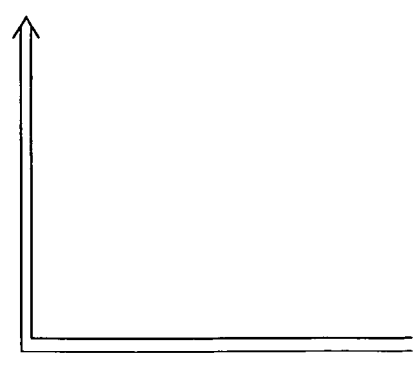

MANUFACTURING METHOD OF DIE FOR OPTICAL ELEMENT MOLDING

TECHNICAL FIELD

The present invention relates to a manufacturing method for manufacturing a die for optical element molding by using a master die.

BACKGROUND ARTS

According to the manufacturing method of a molding die of a plastic optical element which is conventionally generally conducted, a blank (primary product) is manufactured by, for example, steel or stainless steel, and an alloy of an amorphous-like nickel and phosphorous is filmed in the thickness of about 100 µm by a chemical plating, which is called electroless plating, on it, and this plating layer is cutting processed by a diamond tool in an ultra-precise processing machine, and a highly accurate optical surface transfer surface for molding the optical surface of the optical element is obtained.

According to such a method of the conventional technology, because shapes of parts are created basically by the mechanical processing, the part accuracy is easily increased to near the movement accuracy of the processing machine. However, on the other hand, problems are generated in which: the mechanical processing and chemical plating processing are mixed in the manufacturing process and it is vexatiously complicated, and a long period of delivery is necessary; the manufacturing of blank (primary processed goods) is necessary, considering the thickness of plating layer; the plating processing is not always stable, and due to a deviation of composition of the blank or a soiled condition, the attaching strength of the plating layer is dispersed, or a pinhole-like defect which is called a pit, is generated; and because the creation of the optical surface transfer surface is necessary in the thickness of plating layer, there is a case where there is not any margin in the plating thickness when the optical surface transfer surface is re-worked, and the processing can not be conducted.

Further, according to the conventional technology, it is necessary that the optical surface transfer surface is largely cutting processed by a diamond tool, however, in such a case, the influence such as a condition of a cutting edge of the tool or processing condition, a change of processing environmental temperature is exerted, and there is also a problem that the shape of the optical surface transfer surface finished after cutting processing, is delicately dispersed. This processing dispersion of the optical surface transfer surface is due to the poorness of the machinability of the raw material. In general, the optical surface shape error of about 100 nm is generated, and even in the case where processing is conducted very carefully, the shape error of about 50 nm is remained. This is a limit of processing accuracy when a large amount of optical surface transfer surfaces of the same shape are created.

Further, recently, an optical element in which a ring-shaped zone diffraction groove (diffraction ring-shaped zone) is provided on the optical surface and by which the chromatic aberration is efficiently corrected, is put into practical use in the optical information recording field, and a large amount of optical elements are manufactured. As an optical material, plastic or glass is used, however, in the infrared optical system, a crystal material such as ZnSe is also used. Such an optical element can be produced in a large amount and effectively by molding, however, it is a very important problem, at the time of molding, how high-accurately and effectively minute diffraction grooves on the optical surface of the optical element are manufactured by the die for optical element molding.

For example, when minute patterns having the optical function such as the diffraction grooves are created on the optical surface transfer surface of the die for optical element molding, the sharpness of the cutting edge controls the exactness of the diffraction groove shape, and when it is transferred as the optical surface of the optical element, the diffraction efficiency is largely influenced.

Accordingly, for the purpose that the diffraction efficiency of the diffraction ring-shaped zone is not lowered, it is necessary that the dimension of the cutting edge is made sufficiently small, in such a case, because, on the small cutting edge portion, the cutting resistance is concentrically imposed, it is necessary that the incised amount is decreased, and the number of time of processing is increased until the entire optical surface is uniformly cut and removed. Further, it is necessary that the feed speed of the tool is made slow in order also to prevent the deterioration of the surface roughness of the optical surface by the cutter mark of the small cutting edge, and the optical surface transfer surface processing time of one time also becomes long. As a result, in the cutting processing of the die for molding of the optical element having the diffraction groove, because the cutting length is increased, wearing of the cutting edge of the tool is increased, and the tool change becomes often. That is, when the optical surface transfer surface having minute shape is processed by the conventional diamond cutting, because the life of the tool is very shortened and a time period for processing one optical surface transfer surface is also increased, it is necessary that the tool is changed often, therefore, the processing efficiency is very much lowered, and the productivity of the die for optical element molding is lowered, resulting in the rapid increase of the cost. Therefore, particularly, when the optical surface transfer surface having minute shapes on the surface is finished by the diamond cutting, the die manufacturing method which does not include the electroless nickel plating process, and which is simple, and whose delivery date is short, is desirable.

In addition to that, recently, it is tried that the minute structure which is several times smaller or less than the wavelength of the light source to be used, is provided on the optical surface and a new optical function is added to the optical element. For example, the ordinary light converging function by the refraction of the molded lens and a positive dispersion generated as the side reaction at the time are cancelled by using a large negative dispersion by the diffraction obtained when the diffraction groove is provided on the surface of the aspheric surface optical surface, and a method in which the achromatic function, which is originally impossible only by the refraction, is added to a single lens optical element, is put in practice in the objective lens for pick-up apparatus for optical disk, which is DVD/CD compatible. This uses the diffraction action by the diffraction groove whose dimension is several-ten times larger than the wavelength of the light transmitting the optical element, and an area by which the diffraction action by the structure sufficiently larger than the wavelength is managed in this manner is called a scalar area.

On the one hand, it is well known that, in a minute interval which is one several-th of the wavelength of the light transmitting the optical element, protrusions of the conical shape are formed under the crowded condition on the surface of the optical surface, thereby, the reflection suppress function of the light can be exhibited. That is, the refractive index change on the border surface between the air and the optical surface when the light wave is incident on the optical element, is not instantly changed from 1 to the refractive index of the medium as in the conventional optical element, but, it is gently changed by the conical shape of protrusions arranged in minute interval, thereby, the reflection of the light can be suppressed. The optical surface on which protrusions like this are formed is a minute structure which is so-called a moth eye, and when the structural bodies which are minuter than the wavelength of the light are arranged in a period shorter than the wavelength, any longer, each structure is not diffracted and acts on the light wave as an average refractive index. Such an area is generally called an equivalent refractive index area. Relating to such an equivalent refractive index area, for example, it is written in Institute of electronic information communication papers C Vol. J83-C No. 3 pp. 173-181, March, 2000.

According to the minute structure of the equivalent refractive index area, a larger reflection prevention effect can be obtained than the conventional reflection prevention coat while the angle dependency of the reflection prevention effect or wavelength dependency is deceased. However, according to plastic molding, because the optical surface and the minute structure are simultaneously created, it is considered that a merit in the production in which the lens function and the reflection prevention function are simultaneously obtained, and the after processing that the reflection prevention coat processing is conducted after the molding is not necessary, is large, and is remarked. Furthermore, when such a minute structure of an equivalent refractive index area is arranged in such a manner that it has the directionality to the optical surface, the strong optical anisotropy can be given to the optical surface. Therefore, the double refraction optical element, which is conventionally manufactured by cutting the crystal such as quartz crystal, can be obtained by molding. Further, when it is combined with a refraction or reflection optical element, a new optical function can be added to it. The optical anisotropy in this case is called a structural double refraction.

There is a resonance area in which the diffraction efficiency is rapidly changed by a slight difference of the incident condition, between the above-described scalar area and the equivalent refractive index area. For example, when the groove width of the diffraction ring-shaped zone is brought to narrow, a phenomenon (anomary) that the diffraction efficiency is rapidly decreased or increased at about several-times of the wavelength, is generated. When the chracteristic of this area is used, a wave-guide mode resonance lattice filter by which only a specific wavelength is reflected, is realized by the minute structure, and the same effect as an ordinary interference filter can be realized by a smaller angle dependency.

Hereupon, when the optical element is formed by using the scalar area, equivalent refractive index area or resonance area, it is necessary to form the minute protrusions (or hollows) on the optical surface. In order to make mass-production of the optical element having such minute protrusions (or hollows), generally, it can be said appropriate that the molding is conducted by making plastic as a raw material. However, in such a case, it is necessary that the optical surface transfer surface provided with the hollows (or protrusions) corresponding to the minute protrusions (or hollows) is provided in the die for molding of the optical element.

However, relating to the protrusion (or recess) of the equivalent refraction area or resonance area as described above, because it is necessary that protrusions (or hollows) are formed at the interval of several-tens or several-hundreds nm, it is very difficult by the mechanical processing including the cutting processing. In contrast to that, in Tokkaihei No. 2003-160343 (Patent Document 1), the die for optical element molding in which the amorphous alloy having the super-cooling liquid phase is adhered to the substrate, and the optical surface transfer surface for molding the optical surface of the optical element is formed in the amorphous alloy, is disclosed. On the optical surface transfer surface, corresponding hollows or protrusions are formed so that a plurality of protrusions or hollows are transfer-formed on the optical surface of the optical element molded by such a die for optical element molding.

However, as a problem which can be generated when the die written in Patent Document 1 is manufactured, the deformation of the master-die caused in the case of the sticking of the metallic glass to the master-die, or breaking and peeling of the metallic glass film layer generated thereby, or, in the case where single-striking is generated, or the press-pressure is too strong, is presumed. Particularly, when the minute structure such as diffraction groove or step difference shape is provided on the master-transfer surface of the master-die, there is also a possibility that breaking of the minute structure is generated.

Further, when the minute structure is blaze-shape or sinking comb-shape, it is difficult to push the metallic glass to the bottom of groove, as the result, there is also a possibility that the tip of the minute structure corresponding to the blaze-shape or sinking comb-shape transferred on the molding transfer surface of the die for optical element molding is brought to a rounded shape. When the optical element is molded by such a die for optical element molding, because its molding transfer surface shape is transferred onto the optical surface of the optical element as it is, the optical surface of the optical element in which the shape of the primary part of the blaze-shape or sinking comb-shape is inaccurate, is formed, and characteristic of the optical element is lowered.

SUMMARY OF THE INVENTION

The present invention is attained in view of such a problem of conventional technology, and the object of the present invention is to provide a manufacturing method of the die for optical element molding which is easily manufactured and which can increase the dimension accuracy of the optical element.

One of modes of the present invention is a manufacturing method of the die for optical element molding, and which is characterized in that it has: a process for forming the first film layer of the amorphous alloy having the super-cooling liquid phase formed of a predetermined composition on the master transfer surface of the master die for molding the molding transfer surface of the die for optical element molding; a process for heating the first film layer (called also a heating press process) more than the glass transition point of the amorphous alloy having the super-cooling liquid phase while pressing under the condition that the surface of the first film layer and the shifted surface of the base material of the die for optical element molding are faced; and a process for peeling the first film layer from the master die, and for shifting the first film layer to the base material of the die for optical element molding.

According to the present invention, it is a method in which the film layer of the amorphous alloy having the super-cooling liquid phase is formed on the master transfer surface of the master die and by shifting this to the die for optical element molding, the molding transfer surface is obtained. When the shape of the master transfer surface of the master die is transferred onto the transferred surface of the die, because the dynamic transfer by the heating press is not used, even in a case where a minute structure is formed on the master transfer surface, the possibility that it is broken is very low.

BRIEF DESCRIPTION OF THE DRAWINGS

FIGS. 1(a)-1(g) are views showing the manufacturing process of a master die for manufacturing a die for optical element molding.

DETAILED DESCRIPTION OF THE INVENTION

Figure 2:
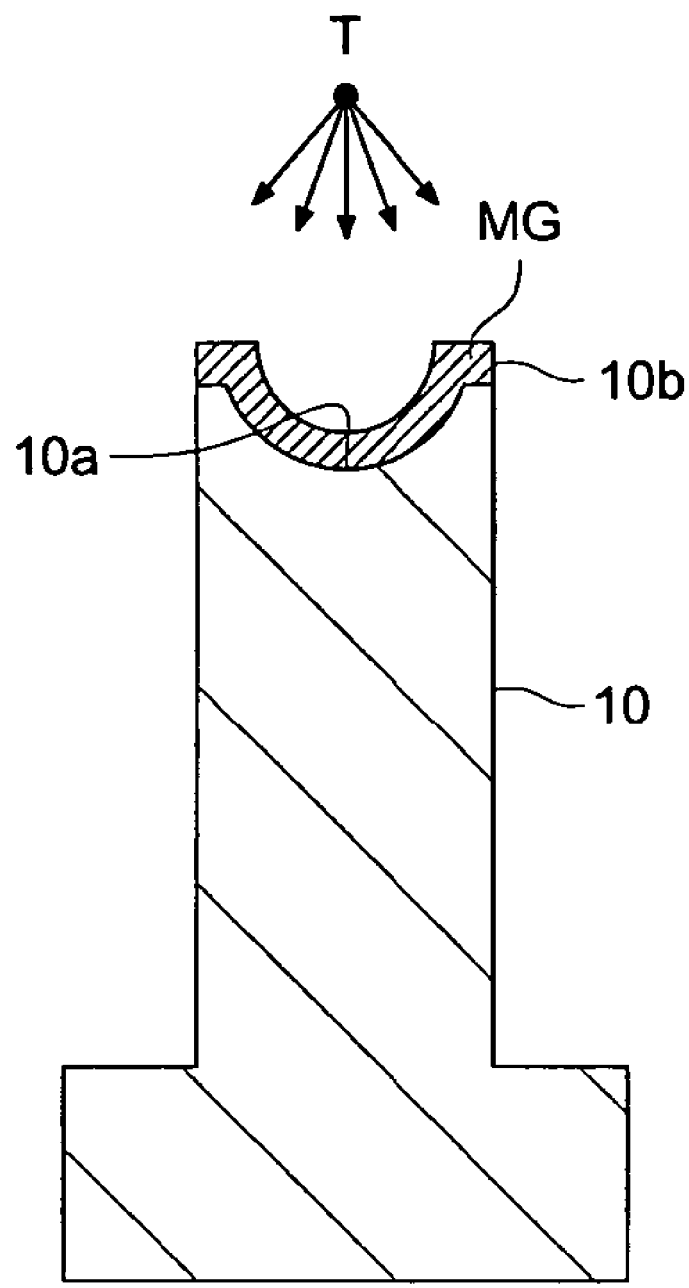
FIG. 2 is a view showing the manufacturing process of the die for optical element molding.
Figure 3A:
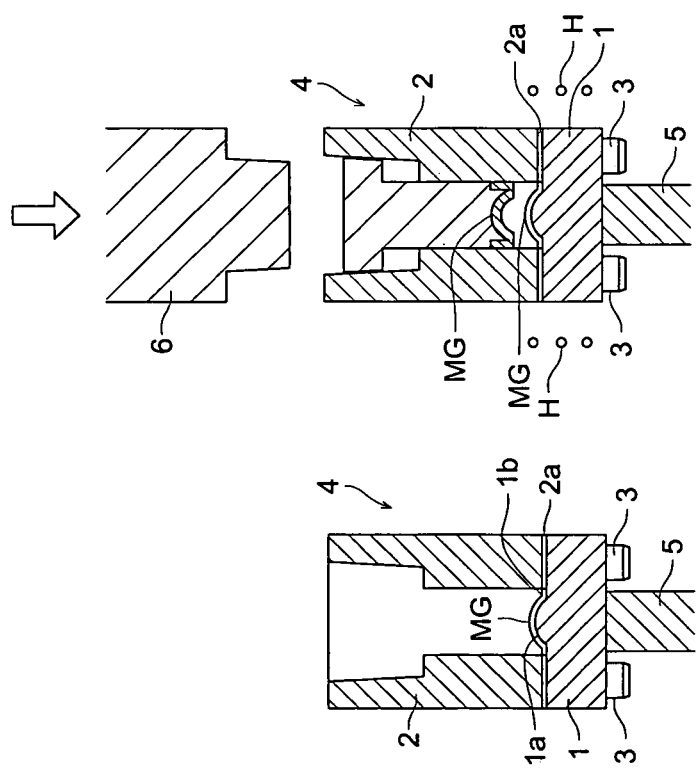
FIGS. 3(a)-3(d) are views showing the manufacturing process of the die for optical element molding.
Figure 3B:
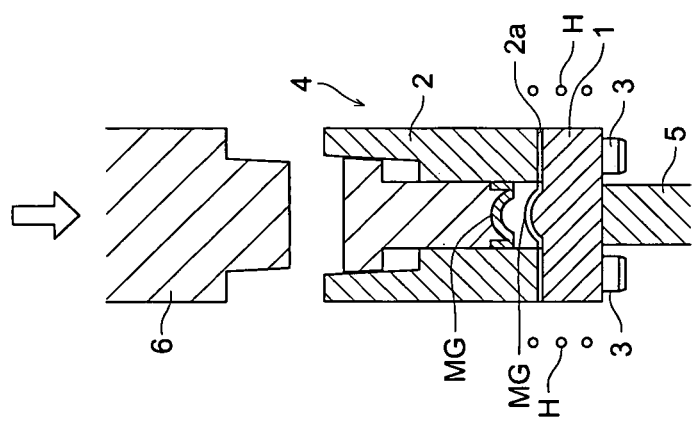
Figure 3C:
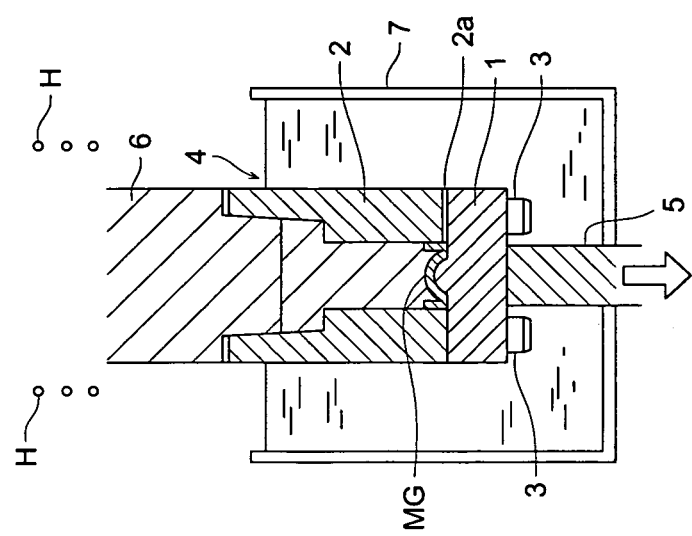
Figure 3D:
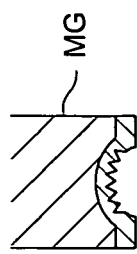

In the case where a film layer of the amorphous alloy having the super-cooling liquid phase is formed on the transfer surface of the master die, when it is formed by, for example, the spattering, it can be accurately transferred to the bottom of the minute structure, and because it is shifted to the die for optical element molding, the very accurate molding transfer surface (for example, the shape accuracy is less than 50 nm to the master die) can be obtained. Accordingly, when one master die having an accurate master transfer surface is created, any number of the die for optical element molding having the same molding transfer surface shape can be obtained.

Further, in the case where the master transfer surface of the master die in which a film layer of the amorphous alloy having the super-cooling liquid phase is formed, and the base material of the die for optical element molding are faced and the press molding is conducted, when the master die is heated more than the glass transition point of the amorphous alloy, an effect can also be obtained that the adhesion of the master die to the film layer of the amorphous alloy having the super-cooling liquid phase is weakened, and they are easily peeled.

A many number of Patent Documents relating to a bulk material of the amorphous alloy having the super-cooling area are well known. However, as one of problems of the amorphous alloy metal having the super-cooling area of the bulk material, there is a problem that it is difficult to stably manufacture the amorphous condition of the crystal structure which is a its large characteristic. In order to produce the amorphous condition, initially, the alloy (called mother alloy) is manufactured in the arc furnace in the way of desired composition, and the mother alloy is heated in the high temperature and liquefied, after that, rapidly cooled at the cooling speed of $10^4$ ° C./sec. Comparing that the metallic glass is amorphous crystal-like, the mother alloy is an alloy only mixed with the metal of the same composition ratio in the furnace, and the crystal condition is a polycrystalline substance. Accordingly, in order to obtain the amorphous alloy having the super-cooling liquid phase of the bulk material, because this cooling process is absolutely necessary, man-day is increased and the manufacturing method is limited because the heated alloy is uniformly rapidly cooled, and further, the skill is necessary for the cooling technology.

In contrast to this, when the film formation is conducted by scattering particles of the desired composition like as, for example, the spattering, the amorphous alloy having the super-cooling liquid phase can be piled in a form of film, and for example, when only a mother alloy can be prepared as a target, because the amorphous alloy having a thin film-like super-cooling liquid phase can be comparatively easily obtained, as compared to a case where the bulk material is used, the manufacturing time period is very much shortened. Further, because the film can be formed into the essential film thickness, the saving of the amorphous alloy having the super-cooling liquid phase can be intended, and the manufacturing cost can be suppressed.

Further, as the mother alloy of the target, the amorphous condition is not always necessary, and when a desired composition ratio is satisfied, there is also a merit that, by scattering and piling particles, it is naturally brought into the amorphous condition. That is, when only a mother alloy target of the same composition ratio as the amorphous alloy having a desired super-cooling liquid phase is prepared, also for the amorphous alloy having the super-cooling liquid phase of the material·composition ratio in which it is difficult to be stably produced in the bulk material, further, also for the material·composition ratio which is not made into the amorphous in the bulk material, it can be easily made into the amorphous and the film can be formed.

Herein, the amorphous alloy having the super-cooling liquid phase, so-called metallic glass will be described. This is structured by amorphous alloy material which is brought into the super-cooling liquid when heated, and in contrast to that the ordinary metals are poly-crystal structure, because the structure is amorphous-like, the composition is uniform also in micro-structure, and this is excellent in the mechanical strength or normal temperature chemical resistance, and has the glass transition point, and because, when it is heated in the range between the glass transition point which is the super-cooling liquid phase and the crystallization temperature (normally, the glass transition point is +10-+100° C.), it is softened into glass-like (becomes viscous fluid body), it has the characteristic which normal metals do not have, and in which the press molding processing can be conducted. Further, also in the cutting processing, it is found that, particularly when the super-precise cutting processing by a diamond tool is conducted, a highly accurate mirror surface can be easily obtained. The reason is considered that it depends on reasons that, because the material is amorphous-like and does not have a grain boundary, the machinability is uniform without depending on the position, or because, in order to keep amorphous-likeness, the crystallization energy is increased, and it is systematically made into the crystalline substance, the enlargement wearing of the diamond in the cutting processing is small, and the life of cutting edge of the tool can be maintained long. As the bulk material in which the optical surface transfer surface can be practically created by the super-precise cutting processing, the material which is conventionally known, is only soft metal, and only by ductility-mode cutting by the amount of very minute depth of cut (about 100 nm), the high hardness material such as silicon or glass can be cutting-processed, however, the efficiency is very low. Accordingly, it can be said that, to use the amorphous alloy as the die material, is a discovery for suggesting the very large application development for the optical surface creation processing centering around the master die. The same processing characteristic comes out in a form that the grinding ratio can be obtained largely, also for the grinding processing by using the diamond grinding stone.

The kind of amorphous alloy, which can be used in the master die (or metallic mold), is not questioned. Publicly known metallic glasses such as Pd series, Mg series, Ti series, Fe series, Zr series can be used, however, alloy material which is amorphous-like having the super-cooling liquid phase, is a requirement necessary in the present invention, and the composition or kinds of them is not questioned. However, as the die material for plastic optical element molding, because the resin temperature is nearly 300° C., Pd series, Ti series, Fe series are advantageous because their glass transition point is high, however, more preferably, Pd series is advantageous also in a point that it is almost not oxidized in the air, and the heat-press can be conducted. In this case, Pd (paradium) is a precious metal and its cost is high, however, the die for optical element molding manufactured by the manufacturing method of the present invention can also re-form the different pattern when the adhered amorphous alloy is heated at need.

In the embodiment of the present invention, it is preferable that, as the film thickness of the amorphous alloy having the super-cooling liquid phase formed in the master die, it is 0.01 μm-500 μm. In the case of the film thickness within this range, the generation of pit is suppressed, and it can be uniformly heated when the amorphous alloy is shifted from the master die to the transferred surface of the metallic mold, and a possibility that the amorphous alloy is crystallized when one portion of it is excessively heated, is low. In the view point in the same manner, it is preferable that the film thickness is 10-200 μm, further, it is preferable that the film thickness is 10-100 μm.

In the embodiment of the present invention, before the process in which at least the first film layer is peeled from the master die, and it is shifted to the base material of the die for optical element molding, it is preferable that the manufacturing method of the die for optical element molding has a process for forming the second film layer of the amorphous alloy having the super-cooling liquid phase on a shifted surface of the base material of the die for optical element molding. Further, in the process in which the first film layer is shifted to the base material of the die for optical element molding, it is preferable that, while the first film layer and the second film layer are being faced and pressed, at least one of the first film layer and the second film layer is heated more than a glass transition point of at least one of the amorphous alloy having the super-cooling liquid phase of the first film layer and the amorphous alloy having the super-cooling liquid phase of the second film layer.

Further, in the above embodiment, it is one of more preferable modes that the composition of the amorphous alloy having the super-cooling liquid phase of the first film layer formed on the master transfer surface of the master die and the composition of the amorphous alloy having the super-cooling liquid phase of the second film layer formed on the transferred surface of the die for the optical element molding are the same.

According to the present invention, because the film layer of the same composition as the film layer of the amorphous alloy having the super-cooling liquid phase formed on the master die is formed also on the base material of the die for the optical element molding, when the film layer of the amorphous alloy having the super-cooling liquid phase formed on the master die and the contact surface of the film layer of the amorphous alloy having the super-cooling liquid phase formed on the base material are heated and close contact with each other, the adhesion of mutual film layers is increased because they have the same composition. As compared to a case where the film layer of the amorphous alloy having the super-cooling liquid phase is simply shifted from the master die to the metallic mold base material, the adhesion of the base material to the amorphous alloy film layer can be more increased. Thereby, an increase of the durability (life) of the die for the optical element molding can be intended.

Further, when the manufacturing method of the die for the optical element molding has a process for forming the second film layer of the amorphous alloy having the super-cooling liquid phase on the shifted surface of the base material of the die for the optical element molding before a process by which at least the first film layer is peeled from the master die and shifted to the base material of the die for the optical element molding, it is also one of preferable modes that the composition of the amorphous alloy having the super-cooling liquid phase of the first film layer and the composition of the amorphous alloy having the super-cooling liquid phase of the second film layer are different from each other.

According to the present invention, because the film layer of the amorphous alloy having the super-cooling liquid phase formed on the base material of the die for the optical element molding is composed of the different composition from the film layer of the amorphous alloy having the super-cooling liquid phase formed on the master die, the glass transition points can be differed from each other. In the case where the film layer of the amorphous alloy having the super-cooling liquid phase formed on the master die and the contact surface of the film layer of the amorphous alloy having the super-cooling liquid phase formed on the base material of the die for the optical element molding are heated and brought into close contact with each other, when a case where they are heated more than the glass transition point of the film layer of the base material and brought into close contact with each other, and a case where they are heated more than the glass transition point of the film layer of the master die and brought into close contact with each other, are separated, the temperature areas can be respectively changed when the film layer of the amorphous alloy having the super-cooling liquid phase is peeled from the master die. Thereby, the risk of the breaking of the master die or peeling of the film layer can be decreased to minimum.

Further, also for the film thickness of the second film layer formed on the transferred surface of the base material of the die for the optical element molding, in the same as the first film layer formed on the master transfer surface of the master die, it is preferable that the film thickness is 0.01 μm-500 μm. From the same reason, in the same view point, 10-200 μm is preferable, and further, 10-100 μm is preferable.

Figure 6:
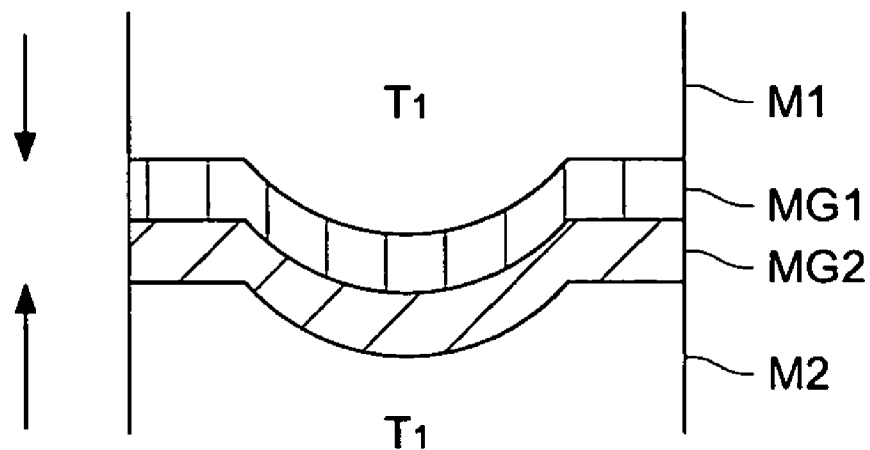
FIGS. 6(a)-6(b) are views generally showing conditions at the time of jointing and die separating of a master die M1 and a die for optical element molding M2.
Figure 6:
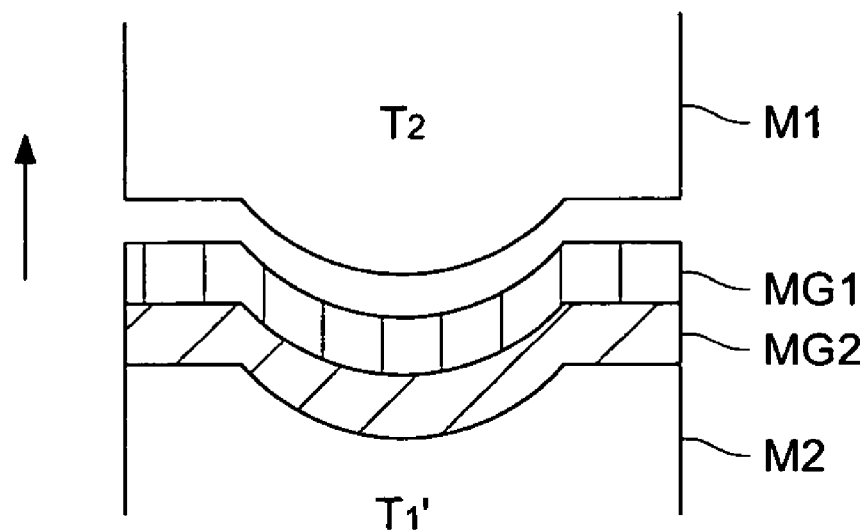

Referring to the drawings, the present invention will be described below. In FIG. 6(a), it is assumed that the film layer of the amorphous alloy MG1 having the super-cooling liquid phase is formed on the master die M1 and the film layer of the amorphous alloy MG2 having the super-cooling liquid phase is formed on the master die M2. Herein, it is assumed that the composition of the amorphous alloy MG1 having the super-cooling liquid phase is, for example, $Pd_{40}Cu_{30}Ni_{10}P_{20}$, and the glass transition point Tg1=300° C. On the one hand, it is assumed that the composition of the amorphous alloy MG2 having the super-cooling liquid phase is, for example, $Pd_{76}Cu_{18}Si_6$, and the glass transition point Tg2=350° C.

The master die M1 and the die M2 for optical element molding are heated to the temperature T1 (350° C.<T1: where, T1 is not larger than the glass crystallization temperature) more than the glass transition point of the amorphous alloy of the formed film layer, and as shown in FIG. 6(a), the film layers of the amorphous alloy are faced so that they-are brought into contact with each other, and pressed. After that, they are cooled once, and the die temperature is lowered from temperature T1. Further, when the die temperature of only the master die M1 side is heated to T2 (300° C.<T2<350° C.: where, T2 is not larger than the glass crystallization temperature), and the die temperature of the die M2 side for optical element molding is made to keep the temperature T1' (<300° C.), the mutual bonding strength of the amorphous alloy MG1 and the master die M1 is weakened more than the mutual bonding power of the die M2 for optical element molding and the amorphous alloy MG2, and more than the mutual bonding power of the amorphous alloy MG2, MG1. From such a condition, as shown in FIG. 6(b), when the master die M1 is separated from the die M2 for optical element molding, the amorphous alloy MG1 is peeled as its shape is transferred from the master die M1 and further, cooled to the normal temperature, it forms a part of the die M2 for optical element molding together with the amorphous alloy MG2. That is, when the glass transition point temperatures of the amorphous alloys MG1, MG2 are adjusted, the mold-releasing property can be increased.

In the manufacturing method of the die for optical element molding of the present invention, it is preferable that it has a process by which the function film (the first function film) is provided on the master transfer surface, before a process by which the film layer of the amorphous alloy having the super-cooling liquid phase is formed on the master transfer surface of the master die.

It is more preferable that the first function film contains at least one kind of element selected from precious metal elements of Pt, Ir, Ru, Rh, Ag, transition metal elements of Fe, Co, Ni, Cr, W, Ti, Mo, Zr, and alumina, chromina, wc, nitriding-silicon, nitriding-carbon, TiN, TiAlN, zirconia, diamond, diamond-like carbon, carbon.

It is one of particularly preferable embodiments that the first function film contains at least one kind of element selected from the precious metal elements of Pt, Ir, Pd, Au, Ru, Rh, Ag, and the transition metal elements of Fe, Co, Ni, Cr, W, Ti, Mo, Zr.

It is preferable that function films listed in them, has a function as the protective film, for example, at the time of molding of glass mold, and in order to improve the mold-releasing function between the glass and the metallic mold at the time of molding, the function film is provided on the molding transfer surface of the metallic mold. When these function films are provided, the mold-releasing performance when the film layer of the amorphous alloy having the super-cooling liquid phase is peeled from the master die, can be increased, and the breakage of the film layer at the time of peeling can be prevented. Further, excepting that it is used as the mold-releasing film, when the molding transfer surface is structured on the molding transfer surface of the die for optical element molding, as 2-layer structure, which is integrally peeled with the film layer, of the film layer of the amorphous alloy having the super-cooling liquid phase and the function film, this function film layer can function as the protective layer of the metallic mold, and there is an effect that the film layer of the amorphous alloy having the super-cooling liquid phase or the material is protected from the influence such as the breakage·deterioration·adhesion from the heat or pressure at the time of the molding transfer of the optical element.

Further, it is one of preferable modes that the first function film also contains at least one material selected from materials of alumina, chromina, WC, nitriding-silicon, nitriding-carbon, TiN, TiAlN, zirconia, diamond, diamond-like carbon, carbon.

It is preferable that function films listed in them, has a function as the protective film, for example, at the time of molding of glass mold, and in order to improve the mold-releasing function between the glass and the metallic mold at the time of molding, the function film is provided on the molding transfer surface of the metallic mold. When these function films are provided, the mold-releasing performance when the film layer of the amorphous alloy having the super-cooling liquid phase is peeled from the master die, can be increased, and the breakage of the film layer at the time of peeling can be prevented. Further, excepting that it is used as the mold-releasing film, when the molding transfer surface is structured on the molding transfer surface of the die for optical element molding, as 2-layer structure, which is integrally peeled with the film layer, of the film layer of the amorphous alloy having the super-cooling liquid phase and the function film, this function film layer can function as the protective layer of the metallic mold, and there is an effect that the film layer of the amorphous alloy having the super-cooling liquid phase or the material is protected from the influence such as the breakage·deterioration·adhesion from the heat or pressure at the time of the molding transfer of the optical element.

Further, it is preferable that the film thickness of the first function film of the present invention is 0.01-20 μm. When such a range is applied, the function as the mold-releasing property or protective film can be obtained. Further, when considering the influence on the metallic mold shape, it is preferable that it is 0.01-0.5 μm, and it is particularly preferable that it is 0.01-0.1 μm.

In the manufacturing method of the die for optical element molding of the present invention, it is further preferable that it has a process by which the second function film is further provided on the film of the first function film before a process by which the film layer of the amorphous alloy having the super-cooling liquid phase is formed.

Further, it is preferable that the second function film also contains at least one kind of element selected from the precious metal elements of Pt, Ir, Pd, Au, Ru, Rh, Ag, transition metal elements of Fe, Co, Ni, Cr, W, Ti, Mo, Zr, and alumina, chromina, wc, nitriding-silicon, nitriding-carbon, TiN, TiAlN, zirconia, diamond, diamond-like carbon, carbon.

In the present invention, it is one of particularly preferable modes that the second function film contains at least one kind of element selected from the precious metal elements of Pt, Ir, Pd, Au, Ru, Rh, Ag, and the transition metal elements of Fe, Co, Ni, Cr, W, Ti, Mo, Zr.

Further, it is also one of particularly preferable modes that the second function film contains at least one kind of material selected from alumina, chromina, wc, nitriding-silicon, nitriding-carbon, TiN, TiAlN, zirconia, diamond, diamond-like carbon, carbon.

Because these function films are 2-layer structure (3-layer structure when the film layer of the amorphous alloy having the super-cooling liquid phase is added), the die-releasing effect from the master die at the time of molding transfer can be given, for example, to the first function film closest from the master transfer surface of the master die, and the effect as the die protective film can be given to the second function film. Hereby, not only the die life is extended, but because at least the second function film and the film layer of the amorphous alloy having the super-cooling liquid phase can be formed in the same process, a process for forming the protective film layer can also be omitted. More specifically, the first function film is formed of carbon, and the second function film can be formed of Pt film.

It is preferable in a point, in which the film thickness can be easily adjusted when the function film is formed by the vacuum evaporation method. Further, in a viewpoint that the function film is uniformly formed, it is preferable that the function film is formed by PVD (Physical Vapor Deposition) processing.

Particularly, as the DVD processing, spattering method, ion-plating method, and vacuum evaporation method are preferably used.

Further, in the formation of the function film, CVD (Chemical Vapor Deposition) processing can also be preferably used.

In the manufacturing method of the die for optical element molding of the present invention, it is preferable that the optical shape of the master transfer surface of the master die is changed corresponding to at least one of the thickness of the function film formed on the transfer surface of the master die and the thermal contraction of the optical element material, to the optical surface shape of the optical element molded by using the die for the optical element molding manufactured by the master die. By such a structure, finally, the optical element having the accurate optical surface shape is obtained, and the labor such as the correction adjusted for the performance of the optical element can be omitted in the after process.

Further, in the manufacturing method of the die for optical element molding of the present invention, it is one of preferable modes that, after a process in which the film layer of the amorphous alloy having the super-cooling area formed on the master transfer surface is peeled from the master transfer surface, and shifted to the base material of the die for optical element molding, the function film remains on the master transfer surface. According to such a structure, the protection of the master transfer surface can be intended.

Further, in the manufacturing method of the die for optical element molding of the present invention, it is also one of preferable modes that, after a process in which the film layer of the amorphous alloy having the super-cooling area formed on the master transfer surface is peeled from the master transfer surface, and transited on the base material of the die for optical element molding, the function film is transited on the molding transfer surface of the die for optical element molding. By such a structure the protection of the molding transfer surface can be intended.

Further, it is preferable that the manufacturing method of the die for the optical element molding further has a process for removing the function film transited on the molding transfer surface of the die for the optical element molding. When such a structure is applied, it can be suppressed that the die-releasing film adhered to the molding transfer surface is adhered to the optical surface of the optical element.

In the manufacturing method of the die for the optical element molding of the present invention, it is preferable that the ring-shaped zone structure around the optical axis is formed on the optical surface of the optical element molded by using the die for the optical element molding manufactured by the master die. By such a structure, the function of the optical element molded by the die for the optical element molding manufactured by the manufacturing method can be more increased.

In the manufacturing method of the die for the optical element molding of the present invention, it is preferable that the ring-shaped zone structure is an optical path difference addition structure. By such a structure, the function of the optical element molded by the die for the optical element molding manufactured by the manufacturing method can be more increased. As the optical path difference addition structure, so-called NPS (Non-Periodic Surface) structure is well known.

In the manufacturing method of the die for the optical element molding written in the present invention, it is preferable that the cross section in the optical axis direction of the ring-shaped zone structure is a saw-toothed-like blaze type diffractive structure. By such a structure, the function of the optical element molded by the die for the optical element molding manufactured by the manufacturing method can be more increased.

In the manufacturing method of the die for the optical element molding of the present invention, it is preferable that the cross section in the optical axis direction of the ring-shaped zone structure is a step-like diffractive structure. By such a structure, the function of the optical element molded by the die for the optical element molding manufactured by the manufacturing method can be more increased. As a step-like diffractive structure, a wavelength selection diffractive structure is well known.

In the manufacturing method of the die for the optical element molding of the present invention, it is preferable that the ring-shaped zone structure has a function by which the aberration change of the optical element due to the wavelength change of the light source which irradiates the light onto the optical element, is corrected. By such a structure, the optical element appropriate for an optical pick-up apparatus by which the recording and/or reproducing of the information is conducted on, for example, the optical disk, can be provided.

In the manufacturing method of the die for the optical element molding of the present invention, it is preferable that the ring-shaped zone structure has a function to correct the aberration change due to the temperature change of the optical element. By such a structure, the optical element appropriate for, for example, the optical pick-up apparatus by which the recording and/or reproducing of the information is conducted on the optical disk, can be provided.

In the manufacturing method of the die for the optical element molding of the present invention, it is preferable that corresponding protrusions or hollows are formed on the master transfer surface of the master die so that a plurality of protrusions or hollows are formed on the optical surface of the optical element formed by the molding transfer surface of the die for optical element molding, and the corresponding hollows or protrusions are formed on the molding transfer surface of the die for optical element molding. By such a structure, the function of the optical element molded by the die for the optical element molding manufactured by the manufacturing method can be more increased. Further, even when it is necessary that the protrusions or hollows are arranged at the interval of several-tens to several-hundreds nanometer, it can be easily formed by the transfer molding without necessity of mechanical processing. Hereupon, hollows or protrusions include the mixture of both of hollows and protrusions.

Further, it is preferable that the protrusions or hollows on the optical surface of the optical element form the minute structure of the equivalent refractive index area. Hereupon, it is preferable when the interval of the protrusions or hollows is not larger than the wavelength of the light transmitting the optical surface of the optical element.

Further, it is preferable that the protrusions or hollows on the optical surface of the optical element form the minute structure generating the reflection prevention effect. Hereupon, it is preferable when the interval of the protrusions or hollows is not larger than the wavelength of the light transmitting the optical surface of the optical element.

As another example, it is preferable that the protrusions or hollows on the optical surface of the optical element form the minute structure generating the structure double refraction. Hereupon, it is preferable when the interval of the protrusions or hollows is not larger than the wavelength of the light transmitting the optical surface of the optical element.

As yet another example, it is preferable that the protrusions or hollows on the optical surface of the optical element form the minute structure in the resonance area. Hereupon, it is preferable when the interval of the protrusions or hollows is not larger than the wavelength of the light transmitting the optical surface of the optical element.

It is also one of preferable embodiments that the protrusions or hollows on the optical surface of the optical element exist in a part of the optical surface, and on a part of the molding transfer surface, corresponding hollows or protrusions exist so that the optical surface is transfer-formed.

It is also one of preferable embodiments that corresponding protrusions or hollows are formed on the master transfer surface of the master die so that the protrusions or hollows of the optical surface of the optical element are formed on a part of the optical surface, and corresponding hollows and protrusions are formed on the molding transfer surface of the die for optical element molding. When protrusions or hollows of the minute structure are formed on the optical surface of the optical element so that they have a plurality of shapes or arrangement patterns, and they are arranged partially on the optical surface, the optical surface can exhibit partially the optical function of these minute structures. Hereby, the optical function generated by each shape or arrangement pattern of the protrusion or recess of the minute structure is partially or selectively provided to the light flux passing the optical surface, and a plurality of optical functions can be incorporated into one light flux. In this case, it is not always necessary that, on the optical surface of the optical element, protrusions or hollows of the minute structure exist on the entire surface of the optical surface. That is, conventionally, it is necessary that a plurality of optical elements are combined in order to exhibit a predetermined optical function, however, when the optical element molded by the die for optical element molding manufactured by the manufacturing method of the present invention is used, because a predetermined optical function can be exhibited singly, the optical system can be more simplified, and the large cost reduction can be realized. Further, according to the die for optical element molding manufactured by the manufacturing method of the present invention, the mass production of such an optical element can be easily conducted.

In the manufacturing method of the die for optical element molding of the present invention, it is also one of preferable embodiments that the molding transfer surface of the die for the optical element molding is formed of only the aspheric surface shape. That is, the optical surface not having the minute structure can also be molded.

In the manufacturing method of the die for optical element molding of the present invention, it is preferable, in a point in which the film pressure can be easily adjusted, that the film layer of the amorphous alloy film having the super-cooling liquid phase is formed by the vacuum evaporation method.

Further, it is preferable, in a point in which a strong adhesion can be realized, that the film layer is formed by PVD (Physical Vapor Deposition) processing.

Particularly, as the Physical vapor deposition method, the spattering method, ion-plating method and vacuum evaporation method are preferably used.

Further, in the formation of the film layer, CVD (Chemical Vapor Deposition) processing can also be preferably used.

Preferable compositions of the amorphous alloy having the super-cooling liquid phase are listed below, however, the amorphous alloy having the super-cooling liquid phase used in the present invention is not limited to these compositons.

It is one of preferable compositions that the film layer of the amorphous alloy having the super-cooling liquid phase contains Pd in the rate of more than 20 mol % and not more than 90 mol %. By such a composition, the oxidation of the amorphous alloy having the super-cooling liquid phase can be suppressed, the heating press can be conducted even in the air-atmosphere.

Further, it is preferable that the composition of the film layer of the amorphous alloy having the super-cooling liquid phase contains more than one of any of Cu, Ni, Al, Si, P, B, at least in the rate of more than 1 mol %.

Further, it is also one of preferable compositions that the film layer of the amorphous alloy having the super-cooling liquid phase contains Zr in the rate of more than 20 mol % and not more than 90 mol %. Because the film layer of the amorphous alloy having the super-cooling liquid phase can be formed without using-the precious metal class element, the burden in the cost is lightened. Further, because the difference between the glass transition temperature Tg and crystallization start temperature Tx is Tg−Tx=about 50-100 C, which is broad, the tolerance of the temperature control can widely secured.

Further, it is preferable that the film layer of the amorphous alloy having the super-cooling liquid phase contains any of Fe, Co, Hf, Ti, Cu, Ni, Al, Sn, Si, P, B, more than one at least in the rate of more than 1 mol %.

It is also one of preferable compositions that the film layer of the amorphous alloy having the super-cooling liquid phase contains Ti in the rate of more than 20 mol % and not more than 90 mol %. Because the film layer of the amorphous alloy having the super-cooling liquid phase can be formed without using the precious metal class element, the burden in the cost is lightened.

Further, it is preferable that, in the composition of the film layer of the amorphous alloy having the super-cooling liquid phase, any of Hf, Zr, Cu, Ni, Co, Fe, Sn, Al, Si, P, B, is contained more than one at least in the rate of more than 1 mol %.

It is also one of preferable compositions that the film layer of the amorphous alloy having the super-cooling liquid phase contains Mg in the rate of more than 20 mol % and not more than 90 mol %. Because the film layer of the amorphous alloy having the super-cooling liquid phase can be formed without using the precious metal class element, the burden in the cost is lightened. Further, because the glass transition point Tg is brought into the vicinity of 150° C., the temperature control becomes comparatively easy.

Further, it is preferable that, in the composition of the film layer of the amorphous alloy having the super-cooling liquid phase, any of Y, Hf, Zr, Cu, Fe, Co, Ni, Al, Si, P, B, is contained more than one at least in the rate of more than 1 mol %.

It is also one of preferable compositions that the film layer of the amorphous alloy having the super-cooling liquid phase contains La in the rate of more than 20 mol % and not more than 90 mol %. Because the film layer of the amorphous alloy having the super-cooling liquid phase can be formed without using the precious metal class element, the burden in the cost is lightened. Further, because the glass transition point Tg is brought into the vicinity of 180-200° C., the temperature control becomes comparatively easy.

Further, it is preferable that, in the composition of the film layer of the amorphous alloy having the super-cooling liquid phase, any of Cu, Ni, Co, Al, Si, P, B, Hf, Zr is contained more than one at least in the rate of more than 1 mol %.

It is also one of preferable compositions that the film layer of the amorphous alloy having the super-cooling liquid phase contains Fe in the rate of more than 20 mol % and not more than 90 mol %. Because the film layer of the amorphous alloy having the super-cooling liquid phase can be formed without using the precious metal class element, the burden in the cost is lightened.

Further, it is preferable that, in the composition of the film layer of the amorphous alloy having the super-cooling liquid phase, any of Co, Ni, Hf, Zr, Ti, Cu, Ni, Al, Sn, Si, P, B, is contained more than one at least in the rate of more than 1 mol %.

It is also one of preferable compositions that the composition of the film layer of the amorphous alloy having the super-cooling liquid phase contains Co in the rate of more than 20 mol % and not more than 90 mol %. Because the film layer of the amorphous alloy having the super-cooling liquid phase can be formed without using the precious metal class element, the burden in the cost is lightened.

Further, it is preferable that, in the composition of he film layer of the amorphous alloy having the super-cooling liquid phase, any of Ni, Hf, Fe, Zr, Ti, Cu, Ni, Al, Sn, Si, P, B, is contained more than one at least in the rate of more than 1 mol %.

It is also one of preferable compositions that the film layer of the amorphous alloy having the super-cooling liquid phase contains Ni in the rate of more than 20 mol % and not more than 90 mol %. Because the film layer of the amorphous alloy having the super-cooling liquid phase can be formed without using the precious metal class element, the burden in the cost is lightened.

Further, it is preferable that, in the composition of the film layer of the amorphous alloy having the super-cooling liquid phase, any of Co, Hf, Fe, Zr, Ti, Cu, Ni, Al, Sn, Si, P, B, is contained more than one at least in the rate of more than 1 mol %.

It is also one of preferable compositions that the film layer of the amorphous alloy having the super-cooling liquid phase contains Mo in the rate of more than 20 mol % and not more than 90 mol %.

Further, it is preferable that, in the composition of the film layer of the amorphous alloy having the super-cooling liquid phase, any of Fe, Co, Ni, Cu, Hf, Zr, Ti, W, Sn, Al, Si, P, B, Pd, is contained more than one at least in the rate of more than 1 mol %.

It is also one of preferable compositions that the film layer of the amorphous alloy having the super-cooling liquid phase contains Pt in the rate of more than 20 mol % and not more than 90 mol %.

Further, it is preferable that, in the composition of the film layer of the amorphous alloy having the super-cooling liquid phase, any of Mo, Fe, Co, Ni, Cu, Hf, Zr, Ti, W, Sn, Al, Si, P, B, Pd, is contained more than one at least in the rate of more than 1 mol %.

It is preferable that, in the composition of the film layer of the amorphous alloy having the super-cooling liquid phase, any of precious metal elements of Os, Pt, Ir, Au, Ag, Rh, Pd, Ru, is contained more than one at least in the rate of more than 1 mol %.

When the die for the optical element molding is manufactured by the manufacturing method of the present invention, a highly accurate die for the optical element molding can be obtained.

Further, when the optical element is molded by the die for the optical element molding, in spite of a low cost, a high accurate optical element can be obtained.

It is preferable in a viewpoint that the optical element can be manufactured at low cost and easily when plastic material is a raw material.

When glass material is a raw material, it is preferable in the viewpoint that the optical element is excellent in the aberration characteristic, and when compared to the plastic material, the performance of the product is stable to the circumstance of high temperature and high humidity, and durability is excellent.

It is preferable that the optical element is a lens, and for example, when it is used for the optical pick-up apparatus, its optical characteristic can be exhibited.

The diffractive structure (diffraction ring-shaped zone) used in the present specification indicates when, on the surface of the optical surface of the optical element (for example, lens), a relief formed as the concentric ring-shaped zone around the optical axis is provided, the diffraction surface by whose diffraction an action by which the light flux is light converged or diverged is given to the light flux. For example, when its cross section is viewed in the plane including the optical axis, it is well known that each ring-shaped zone is a saw-toothed shape, however, such a shape is included. The diffraction ring-shaped zone is called also the diffraction groove.

When the present invention is applied, the shape of each of minute structures or arrangement period such as the arrangement of the ring-shaped zone structures or protrusions (or hollows) is not related. Even when what sort of minute structure it is, when it is the structure manufactured for the purpose to add a new function to the optical element, the die for the optical element molding or the optical element molded thereby, is included in a category of the present invention. Further, as the newly added function, it is not limited to a function to reduce the aberration. Even a case where the aberration is intentionally increased corresponding to the characteristic of the optical system, so long as it is conducted for the purpose finally to bring it near to the aberration which is an ideal, it is included in a category of the present invention.

Referring to the drawings, the embodiment of the present invention will be described below. FIGS. 1(a) to 1(g) are views showing an example of the manufacturing process of the master die for manufacturing the die for optical element molding. Hereupon, a creation of the shape of the master transfer surface is not limited to the following method, but, for example, as shown by an example which will be described later, it may also be formed by the cutting processing. Initially, as shown in FIG. 1(a), the master transfer surface 1a is formed on the master die material 1. In such a master transfer surface 1a, it is preferable when its shape is determined considering the thickness of the function film which will be described later, or the thermal contraction of the raw material of the optical element, to the designed optical surface shape of the lens (an example of the optical element) desired to be formed by the die for optical element molding. The periphery of the master transfer surface la is a mother geometrical dimension reference surface 1b corresponding to a tilt reference plane.

Succeedingly, as shown in FIG. 1(b), while the master die material 1 is rotated around the optical axis by the drive body, not shown, the resist R is coated on the master transfer surface 1a and the mother geometrical dimension reference surface 1b (spin coat). The resist R is coated with an equal film thickness on the master transfer surface 1a and on the upper surface of the master die material 1 including the mother geometrical dimension reference surface 1b.

Further, onto the master transfer surface 1a on which the resist R is coated, the electronic beam LB is irradiated by the exposing machine, and the minute pattern is exposure-formed. Succeedingly, as shown in FIG. 1(c), the master die material 1 is sintered in the solution, and on the master transfer surface 1a, the resist R is removed corresponding to the exposure-formed minute pattern. Herein, because the beam diameter of the electronic beam LB is very small, and the exposure can be conducted at the interval of several-tens to several-hundreds nano-meter, the resist R can be removed corresponding to it.

Further, as shown in FIG. 1(d), the upper surface of the master die material 1 from which the resist R is partially removed, is exposed in the atmosphere of ion-shower IS (accelerated argon-ion) (dry etching), and corresponding to the pattern of the resist R, the surface of the master die material 1 is removed. In this case, because, in the remaining part of the resist R, the surface is not removed or hardly removed, when the circular resist R is remained thick at the time of exposure, corresponding to it, a many number of concentric circular ring-shaped zones are formed on the surface of the optical transfer surface 1a' of the master die material 1.

After that, a target T (precious metal film, transition meal film, ceramics, or oxide·nitride·diamond) is arranged facing the master transfer surface 1a, and from here, particles are scattered, and the function film FM (FIG. 1(g)) of 0.01 μm-20 μm is formed on the master transfer surface 1a (a process to form the function film). Hereupon, in order to transfer highly accurately the master transfer surface 1a, it is preferable that the function film FM is as thin as possible.

Further, the target T is changed to a predetermined composition one, and as shown in FIG. 1(e), from here, the amorphous alloy particles having the super-cooling liquid phase are scattered, and the film layer MG of 0.1 μm-500 μm of the amorphous alloy having the super-cooling liquid phase is formed on the master transfer surface 1a (a process to form the film layer of the amorphous alloy having the super-cooling liquid phase). An enlarged view of the master transfer surface 1a after such a process is shown in FIG. 1(g).

The master die material 1 formed in such a manner, is fixed by a bolt 3 in a form to close one end of the tubular cylinder 2, and the master die 4 is formed (FIG. 1(f)). Between a cylinder 2 and the master die material 1, a groove 2a is formed on the end surface of the cylinder 2 so that an air vent is formed. Hereupon, for the processing of the master die material 1, a large-scale equipment is necessary, and its manufacturing cost is also high, however, when there is one equipment, because a large amount of the dies for optical element molding can be manufactured in the manner as will be described later, it is not particularly problem.

FIG. 2 is a sectional view of the die for optical element molding. Initially, the base material 10 is formed from stainless steel. The material of the base material 10 is not particularly limited, however, commonly used die material such as steel or stainless steel is preferable, and in this case, there is a merit that a supply is stable and the price is low. The base material 10 as a blank corresponds to the optical surface (for example, aspheric surface) of the optical element in one end (in the view, an upper end), however, when the concave portion (shifted. surface) 10a whose curvature is larger than it, or equal to it, and a peripheral surface 10b of its periphery are formed, it has the approximate shape of the metallic mold. The accuracy of the shape of the concave portion 10a and peripheral surface 10b depends on the film thickness of the amorphous alloy MG (hereinafter, simply called amorphous alloy) having the super-cooling liquid phase provided on the surface, however, when it is a case where the film of the amorphous alloy MG of about 100 μm is formed, and it has the accuracy of 10-20 μm, because it is enough, the blank processing itself takes a time period of about several-tens minutes by using a NC lathe. Onto this concave portion 10a and the peripheral surface 10b, the amorphous alloy MG having the super-cooling liquid phase is adhered in the following manner.

The amorphous alloy MG is film-formed on the surface of the concave portion 10a and the peripheral surface 10b, in the manner whose detail will be described later in examples, by the PVC processing such as spattering or vapor deposition, or Chemical vapor deposition method (a process to form the film layer of the amorphous alloy having the super-cooling liquid phase on the shifted surface). Hereupon, the composition of the film layer of the amorphous alloy having the super-cooling liquid phase can be same as that of the film layer formed on the master die material 1, or different from that. In the present embodiment, other than the concave portion 10a, also on the peripheral surface 10b, the amorphous alloy MG is film-formed, however, the film formation may be only on the concave portion 10a.

The film formation of the amorphous alloy MG described above is, in Chemical vapor deposition method, because the master die material 1 or base material 10 becomes high temperature, disadvantageous in the characteristic of the amorphous alloy which is in a state of super-cooling liquid, however, the present invention is not limited to either one of Chemical vapor deposition method or Physical vapor deposition method. In the Physical vapor deposition method by which the amorphous alloy MG is comparatively easily film-formed, there is a processing such as spattering, ion plating, or vacuum evaporation, however, herein, any one may be used. In this connection, in the spattering method, the target material may also be not always in the amorphous condition, and when the structuring atom is adhered in a desired composition ratio to the master die material 1 or base material 10, in the principle of the spattering, because the quick cooling is followed at the time of the adhering, the target material can be easily film-formed in the amorphous condition. The film formation speed is about 0.2-several μm/h, and when the output of the spattering apparatus is increased, the time period of the film formation can be easily reduced, however, because the temperature of the master die material 1 or base material 10 is risen, and it does not become amorphous-like, the cooling of the master die material 1 or base material 10 by the water cooling becomes necessary. Whenever the film thickness is so much large, because the efficiency is bad for a reason that the machining allowance remains so much in the diamond cutting processing or heating press molding, normally, about 100 μm is more preferable. However, in the complicated shape, there is a case where several mm film thickness is necessary, and generally, a range of 10 nm-1 mm is a practical film thickness range.

Particularly in the case where the film thickness is large, by the amorphous alloy spread out in unnecessary part, there is a possibility that the designed shape of the die for optical element molding is damaged. Therefore, there is a case where it is necessary that the excepting part of the film formation part is masked, or after film formation, the spread out part is removed by the diamond cutting or grinding processing. However, because the amorphous alloy MG is good in the machinability, and the removed amount is small, there is scarcely a burden of the processing man-hour or cost.

As the present embodiment, when the amorphous alloy MG is used for only a very limited part of the master die or the die for optical element molding in this manner, the amorphous alloy of the kind in which conventionally although having an excellent physical characteristic, the manufacturing of the bulk shape is difficult, can also be applied for the die for optical element molding. For example, the highly hard amorphous alloy such as nickel-series or copper-series can be expected for the high durability as the metallic mold material, however, because it can hardly be brought into the bulk-like, by the method of the preceding application, the application to the die for optical element molding is difficult, however, as in the present embodiment, when the film is formed, the application becomes possible. Further, although, in the bulk material, at the time of the metallurgy, because there are gasses of hydrogen in the ingot metal, minute holes exist, and when the diamond cutting or heating press molding is conducted, they appear on the optical surface which is processing-created, and there is a case where the surface failure is generated, however, in the case where film formation is conducted from the gas phase by the Chemical vapor deposition method or Physical vapor deposition method as in the present embodiment, because there is almost no case where these minute holes are generated, the manufacturing yield of the die for optical element molding can be kept high, and, for example, because a case where a spare corresponding to a poor molding die is manufactured, becomes unnecessary, the cost is very much reduced.

FIGS. 3(*a*)-3(*d*) are views showing a formation process of the optical transfer surface of the die for optical element molding by the heating press and the geometrical dimension reference surface transfer surface. Initially, a support 5 is attached as shown in FIG. 3(*a*) to the master die 4 made in the process shown in FIGS. 1(*a*)-1(*g*). Next, as shown in FIG. 3(*b*), the master transfer surface 1*a* and the periphery of the mother geometrical dimension reference surface 1*b* are preliminarily heated by the heater H arranged in the periphery of the master die material 1, and the base material 10 made in the process shown in FIG. 2, is inserted into a cylinder 2, and pressed by a plunger 6 (heating press process). In this case, the air in the cylinder 2 flows out to the outside through an air vent (groove 2*a*). Herein, the amorphous alloy MG of the master die 4 which is heated higher than the glass transition point Tg, and the amorphous alloy MG of the base material 10 are fused with each other, and integrated.

Further, as shown in FIG. 3(*c*), when the master die 4 and the plunger 6 are integrally sunk in a vessel 7 filled with the cooling water, the amorphous alloy MG is quickly cooled. Hereupon, such a cooling may also be a natural cooling. After that, when the master die 4 and the plunger 6, which are taken from the vessel 7, are separated, the amorphous alloy MG which is in a condition of easy die-release by the function film FM filmed on the master transfer surface of the master die 4, is peeled off, and shifted to the base material 10 (a process to shift the film layer to the base material). In this manner, the die for the optical element molding 10' (FIG. 4) onto which the master transfer surface is transferred can be taken out. When the amorphous alloy whose optical surface shape is deep or complicated, or which is easily oxidized, is heating press-molded, it is preferable that processes of the heating, molding, cooling are conducted in the vacuum.

Hereupon, when the function film FM remains on the master transfer surface 1*a* side, it functions as a protective film of the master die material 1, and when it is shifted to the base material 10 side together with the amorphous alloy MG, it functions as a protective film of the metallic mold. However, in the case where there is a possibility that it adheres to the optical element in the molding, when, as the raw material of the function film FM, for example, a material which is dissipated by the heat, is used, after the function film FM is opened to the air, when passing through a process by which it is heated and removed, the accurate optical element can be obtained.

Figure 4:
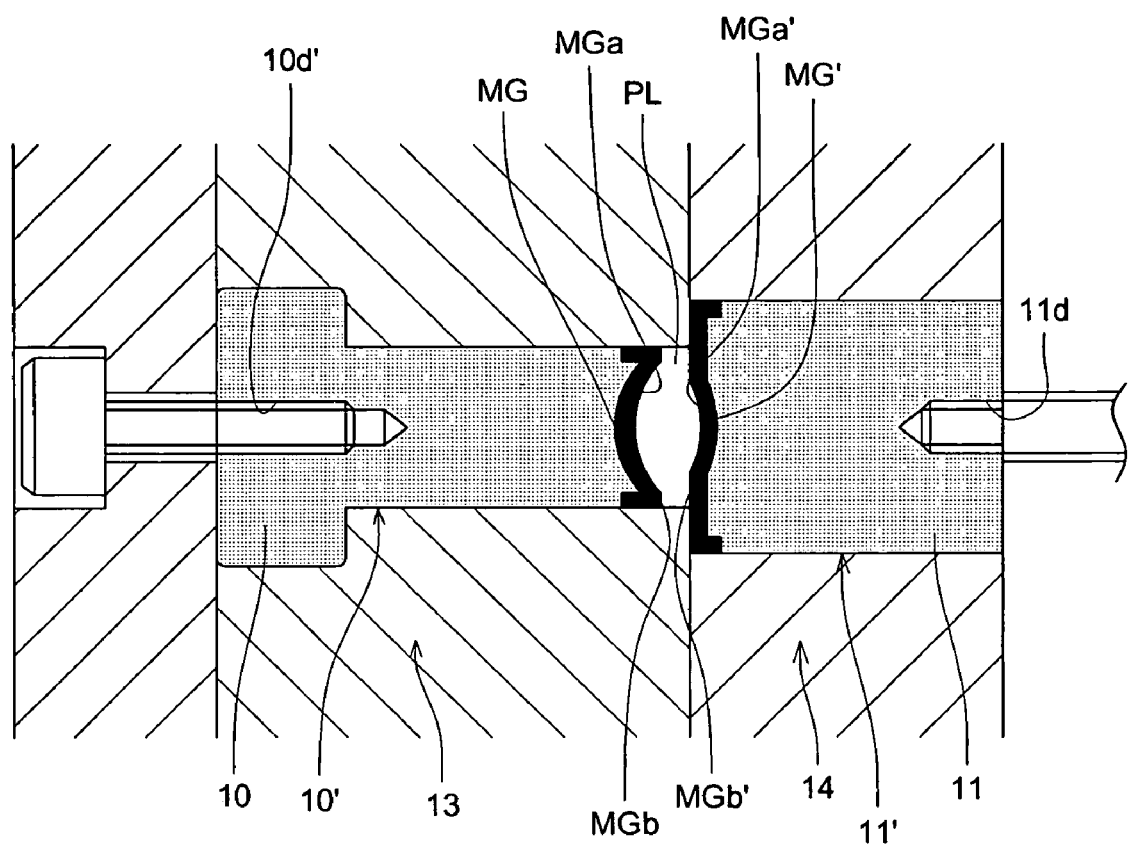
FIG. 4 is a sectional view of a die set including the die for optical element molding for forming a lens, which is an optical element.

FIG. 4 is a sectional view of a die-set including the die for optical element molding for forming the lens which is an example of the optical element. In the manner as described above, when the die for optical element molding 10' on which the amorphous alloy MG is film-formed and the die for optical element molding 11' on which the amorphous alloy MG' is film-formed in the same manner, are inserted into the die-set metallic molds 13, 14, so that mutual optical surface transfer surfaces MGa, MGa' and mutual geometrical dimension reference surface transfer surfaces MGb, MGb' are faced each other, and when the fused plastic material PL is injected from a gate, not shown, between the die for optical element moldings 10', 11', in the same manner as the ordinal injection molding, and further, cooled, a lens having a desired shape can be obtained. Hereupon, even in the case where screw holes 10*d'*, 11*d* for the die-set fixing are processed, different from the amorphous alloy MG, because it may be allowable when the base materials 10, 11 having the good toughness are drilled and tapped, the damage at the time of processing can be suppressed, further, also for the external force at the time of molding, because the base materials 10, 11 are deflected and have a function to soften the concentration of stress, the damage is suppressed.

As described above, in the present embodiment, in the case where the optical surface transfer surface MGa or geometrical dimension reference surface transfer surface MGb is created by the heating press molding, it is enough when a part on which the amorphous alloy MG is film-formed is preponderantly heated and softened, and pressed to the heated master die 1. An important thing is that, in the present embodiment, the amorphous ally MG is not used for the entire die for optical element molding 10', but limited to be used for only a layer forming the optical surface transfer surface MGa or geometrical dimension reference surface transfer surface MGb and only its periphery, and it is not necessary that the entire base material 10 is uniformly heated. Accordingly, as compared to a case where the entire amorphous alloy of the bulk material is heated and press molded, because the thermal capacity is small and the heating is easy, the temperature control can also be accurately conducted, and because the press deformation amount is also small, the pressing time period can be very much reduced. These characteristics are very convenient conditions not only for a reason that the molding process is easily controlled, but also for preventing the crystallization of the amorphous alloy in heating. As the result, the crystallization is not concerned about, and the heating press molding can be re-tried any number of times, thereby, the shape correction of the optical surface transfer surface MGa or recycle can be conducted without melting-down, further, also for a certain kind of amorphous alloy in which, although it has the excellent physical characteristic, the heating press molding can not be conducted for a reason that it is easily crystallized, it can be applied for the die for optical element molding.

For the atmosphere of the heating press molding, it is preferable that, ordinarily, it is conducted in the vacuum in order to prevent the oxidation of the amorphous alloy or the crystallization according to that, and because, even when palladium amorphous alloy is heated in the air, the alloy is hardly oxidized, the heating press molding can be conducted in the air. In this case, because the heating press molding apparatus does not need to keep the vacuum atmosphere, it can be made further simple, and there is a merit that the heating press molding can be conducted in the air while being directly visually observed.

As palladium amorphous alloy, there is $Pd_{40}Cu_{30}Ni_{10}P_{20}$ or $Pd_{76}Cu_6Si_{18}$, $Pd_{61}Pt_{15}Cu_6Si_{18}$, however, when palladium is not contained at least more than 20 mol %, the other composition atom is brought to be oxidized or easily crystallized, and the heating press molding in the air becomes difficult. On the one hand, when the containing amount of palladium is more than 80 mol %, generally, the glass transition point does not exist, and the amorphous alloy is not formed. Therefore, as a material of the amorphous alloy in which the heating press molding is stably conducted in the air, it is preferable that palladium containing amount is not smaller than 20 mol % and not larger than 80 mol %. Further, when viewed from the composition atom other than palladium which is the maximum containing atom, it is necessary that any one of Cu, Ni, Al, Si, Pd, Br is contained more than one at least more than 3 mol %, for forming the amorphous-like amorphous alloy. This is not limited to the palladium amorphous alloy, but this can be said to the amorphous alloy of almost series such as, for example, $Zr_{55}Al_{10}Cu_{30}Ni_5$, $Zr_{57}Ti_3Al_{10}Ni_{10}Cu_{20}$, $La_{65}Al_{15}Ni_{20}$, $La_{55}Al_{15}Ni_{10}Cu_{20}$, $Co_{51}Fe_{21}Zr_8B_{20}$, $Fe_{56}Cu_7Ni_7Zr_{10}B_{20}$, $Mg_{75}Cu_{15}Y_{10}$, $Mg_{70}Ni_{20}La_{10}$. Further, in the heating press molding in the air atmosphere, when a closed space is formed between the master die and the molding surface of the amorphous alloy, an air well is formed, and there is a case where the transferability of the heating press molding is deteriorated. In this case, even when the material is palladium amorphous alloy, it is allowable when the heating press molding is conducted in the vacuum. In the die for molding of the optical element having the minute structure such as the diffraction ring-shaped zone on the optical surface, because a minute air well is easily formed particularly, in minute structural part, and its transferability is largely deteriorated, it is better when heating press molding is conducted in the vacuum.

When the amorphous alloy of the precious metal such as palladium series is used for the die for optical element molding, because there is a precious bare metal value by only one of metallic molds, in the molding production process of the optical element, in order to treat a lot of such precious and small parts, a problem in the security that the storage control is made severe, is inevitable. However, in the die for optical element molding as in the present embodiment, because the film thickness of the amorphous alloy can be made to abut 100 μm, and the bare metal value is merely comma several %, there is a very important practical characteristic to the technology of the preceding application in which the storage control may be the same as the conventional one.

In the die for optical element molding formed by the manufacturing method of the present embodiment, the chemical plating processing as in the conventional metallic mold, is not necessary at all, and the optical surface transfer surface can be created highly accurately and efficiently, and accordingly, there is an excellent characteristic in which, although the high accurate optical surface of the optical element can be transfer-molded, it is low cost and short delivery time period and can be handled in the same production form as the conventional one. Further, the metallic mold for molding of the optical element having the minute structure can also be easily created.

Figure 5A:
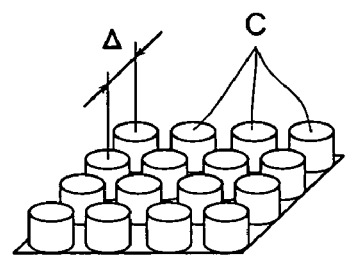
FIGS. 5(a)-5(d) are perspective views enlargedly showing an optical surface of the lens formed by the die for optical element molding.

FIGS. 5(a)-5(d) are perspective views enlargedly showing an example of the optical surface of a lens formed by such a die for optical element molding. In FIG. 5(a), a structure (an example of the minute structure of the equivalent refractive index area) in which, on the optical surface of the lens, as an example of a plurality of protrusions, a many number of minute cylinders C are matrix-likely formed, is shown. For example, when such an objective lens is used as the objective lens of the optical pick-up apparatus for DVD recording/reproducing, the wavelength of the light transmitting the lens is about 650 nm. Accordingly, when the interval Δ of the minute cylinder C is 160 nm, the light incident on such an objective lens is slightly reflected, and the objective lens whose light transmission is very high, can be provided.

Figure 5B:
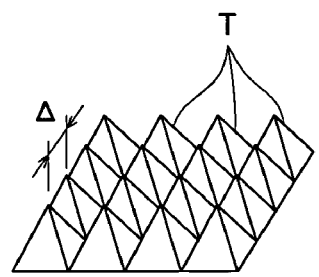
Figure 5C:
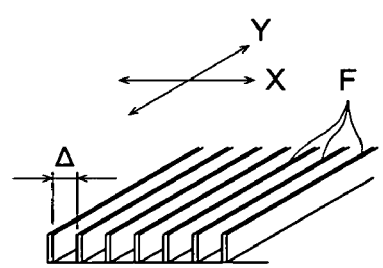
Figure 5D:
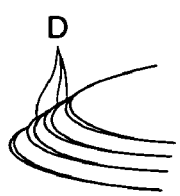

In FIG. 5(b), on the optical surface of the lens, as an example of a plurality of protrusions, a large number of minute triangle cones T separated by the interval Δ are formed, and it has the same remarkable effect as FIG. 5(a). As this interval Δ, when it is not larger than 0.1-0.2 μm, it is preferable because scattering is lowered. In FIG. 5(c), on the optical surface of the lens, as an example of a plurality of protrusions, a large number of fins F (an example of the minute structure of the structure double refraction) separated by the interval Δ are formed. The length of fin F is longer than the wavelength of the transmitting light (in the above example, not smaller than 650 μm). The lens provided with such a structure transmits the light having the oscillation surface in the direction along the fin F, however, a so-called polarizing effect that the light in the direction crossing the fin F is not transmitted is taken. In FIG. 5(d), on the optical surface of the lens, as an example of the ring-shaped zone structure around the optical axis, the blaze type diffraction ring-shaped zone D whose section in the optical axis direction is saw-tooth-like, is formed. For the diffraction ring-shaped zone D, because the chromatic aberration correction and the temperature correction, which are effects corresponding to the shape, are described in detail, for example, in Tokkai No. 2001-195769, the description hereafter will be neglected. As the other ring-shaped zone structure, NPS, DOE can also be formed. Further, in FIGS. 5(a)-(c), an example in which those protrusions are provided on the plane is shown in order to simply describe it, however, the bottom surface is made a curved surface having an appropriate curvature of the spherical surface or aspheric surface, and the protrusions may also be provided on the curved surface.

EXAMPLES

Comparative Example

A comparative example carried out by the present inventors will be described below. Initially, as a base material of the die for the optical element molding of about 3-5 mm diameter, a material in which iron is contained in main component, and which can be easily cut, is prepared. When the die for the optical element molding is manufactured, initially, 5 blank metallic molds (called also base material of the metallic mold) are manufactured by cutting·grinding processing. A die base material surface of the blank metallic mold is (grinding·cutting) processed in the shape accuracy not larger than 100 μm, and the concave surface corresponding to the aspheric surface of the optical element is formed. On this base material surface, the film layers of the amorphous alloy having the super-cooling liquid phase between 295-396° C. are respectively formed in the film thickness of 0.02, 10, 50, 100, 500 μm.

On the one hand, for the master die, initially, as the master die material of the die for the optical element molding of about 3-5 mm diameter, a material in which iron is contained in main component, and which can be easily cut, is prepared. The master die material is manufactured by cutting·grinding processing. The master transfer surface of the master die material is (grinding·cutting) processed in the shape accuracy of not larger than 100 μm. After this, the electroless nickel plating is film-formed in the thickness of about 100 μm. This plated master die molding transfer surface is cut by the diamond tool, and the master die is completed.

Further, the master die in which the amorphous alloy film layer is not formed, is arranged facing the raw material of the metallic mold in which the amorphous alloy film layer having the super-cooling liquid phase between 295-395° C. is formed, and heated to 310° C. more than the glass transition point, and by press molding for one hour under a force of 300 N, the shape and structure of the master transfer surface of the master die are transferred onto the amorphous alloy film layer of the raw material of the metallic mold. Even in this comparative example, a large amount of high accurate metallic molds can be obtained only by simple processes of heating and pressing. However, the temperature control and pressure control at the time of heating press are difficult, and when the heating press molding is conducted under the inappropriate condition, it is found that, regardless of the thickness of the amorphous alloy film layer formed on the metallic mold base material, beginning from the insufficient molding transfer, the breakage of the master die or the peeling of the amorphous alloy film layer is generated. Particularly, when the minute structure (for example, blaze shape) is provided on the master transfer surface of the master die, it is found that, when the heating press pressure is too high (more than 500 N, particularly, a case where a half part of it is touched, inclined and brought into contact with the die), or when the temperature of a part of the amorphous alloy film layer in contact with the master transfer surface does not arrive to the glass transition temperature, there is a possibility that the minute structure or the master die shape is broken. Further, it is also found that, as the minute structure, for example, when the blaze shape of 5 μm pitch and 1 μm height is transferred, it is difficult that the amorphous alloy which is viscous fluid in the super-cooling liquid phase is spread to the bottom, and the insufficient molding transfer of about 50 nm is generated.

Example

In contrast to this, an Example carried out by the present inventors will be described below. Initially, 5 base materials of the master die and metallic mold are manufactured in the same manner as the comparative example. After that, also on the base material of the metallic mold, simultaneously with the master transfer surface of the master die, the amorphous alloys having the super-cooling liquid phase Tg-Tx between 295-395° C., are respectively film-formed by the spattering film formation apparatus in the thickness of 0.02, 10, 50, 100, 500 μm. After that, the master transfer surface of the master die on which the amorphous alloy film layer is formed and the base material (or, base material of the metallic mold on which the amorphous alloy film layer having the super-cooling liquid phase is formed) are oppositely arranged, and in the atmosphere (about 100 Pa) substituted by He-gas, when it is heated to 310° C. which is more than the glass transition point, and press-molded under 200 N for one hour, the amorphous alloy film layer formed on the master transfer surface of the master die is peeled form the master die, and transferred onto the base material. (or, onto the base material on which the amorphous alloy film layer having the super-cooling liquid phase is formed) of the metallic mold, (for the above 5-kinds of the film thickness of the amorphous alloys on the master die, it is conducted in the same manner).

When the temperature of the master die is 330° C., and the temperature of the base material of the metallic mold is 300° C., although they are more than Tg, when the thermal gradient is provided, it becomes a good condition in a point of releasing from the master die and an increase of the adhesion to the die material. In the heating method of the metallic mold, when a cartridge heater or a sheath heater is inserted into both dies, or, the auxiliary heating is conducted by lamp heating from the periphery, the heat control can be effectively conducted, and the heater output can be greatly utilized.

According to the manufacturing method of the die for optical element molding according to the example, because it is not the shape transfer by the dynamic molding method, but the transfer by the reversal shape by the film formation method such as the spattering, it can be seen that any of minute shapes of the master die can also be transferred, and there is no damage of the die. Although the film thickness of the amorphous alloy formed on the master die are distributed as described above, the same effect can be obtained.

EFFECT OF THE INVENTION

According to the present invention, a manufacturing method of the die for optical element molding by which the accuracy of dimension of the optical element can be increased although the manufacture is easy, can be provided.

What is claimed is:

1. A manufacturing method of a die for molding an optical element, the manufacturing method comprising:
    forming the first film layer of an amorphous alloy having a super-cooling liquid phase onto a master transfer surface of a master die for molding a molding transfer surface of the die;
    heating the first film layer more than a glass transition point of the amorphous alloy having the super-cooling liquid phase while a surface of the first film layer and a transferred surface of a base material of the die being faced and pressed; and peeling the first film layer from the master die and transferring the first film layer onto the base material of the die to form the molding transfer surface of the die.

2. The manufacturing method of claim 1, wherein, in the step of forming the first film layer on the master transfer surface of the master die, the film thickness of the first film layer is 0.01-500 μm.

3. The manufacturing method of claim 1, wherein the manufacturing method further comprises forming a second film layer of an amorphous alloy having a super-cooling liquid phase on the transferred surface of the base material of the die before the step of peeling the first film layer from the master die and transferring the first film layer onto the base material of the die, and wherein, in the step of transferring the first film layer onto the base material of the die, at least one of the first film layer and the second film layer is heated more than glass transition point of at least one of the amorphous alloy having the super-cooling liquid phase of the first film layer and the amorphous alloy having the super-cooling liquid phase of the second film layer while the first film layer and the second film layer are faced and being pressed.

4. The manufacturing method of claim 3, wherein a composition of the amorphous alloy having the super-cooling liquid phase of the first film layer and the composition of the amorphous alloy having the super-cooling liquid phase of the second film layer are the same.

5. The manufacturing method of claim 3, wherein a composition of the amorphous alloy having the super-cooling liquid phase of the first film layer and the composition of the amorphous alloy having the super-cooling liquid phase of the second film layer are different from each other.

6. The manufacturing method of claim 3, wherein the film thickness of the second film layer is 0.01-500 μm.

7. The manufacturing method of claim 1, wherein the manufacturing method further comprises providing a first function film on the master transfer surface of the master die, before the step of forming the first film layer of the amorphous alloy having the super-cooling liquid phase on the master transfer surface of the master die.

8. The manufacturing method of claim 7, wherein the film thickness of the first function film is 0.01 —20 μm.

9. The manufacturing method of claim 7, wherein the first function film contains at least one kind of substance selected from the group consisting of precious metal elements of Pt, Ir, Pd, Au, Ru, Rh, and Ag, the transition metal elements of Fe, Co, Ni, Cr, W, Ti, Mo and Zr, alumina, chromina, tungsten carbide, silicon nitride, carbon nitride, TiN, TiAlN, zirconia, diamond, diamond-like carbon and carbon.

10. The manufacturing method of claim 9, wherein the first function film contains at least one kind of element selected from the group consisting of the precious metal elements of Pt, Ir, Pd, Au, Ru, Rh and Ag, and the transition metal elements of Fe, Co, Ni, Cr, W, Ti, Mo and Zr.

11. The manufacturing method of claim 9, wherein the first function film contains at least one kind of raw material selected from the group consisting of alumina, chromina, tungsten carbide, silicon nitride, carbon nitride, TiN, TiAlN, zirconia, diamond, diamond-like carbon and carbon.

12. The manufacturing method of claim 7, wherein the manufacturing method further comprises providing a second function film on the first function film, before the step of forming the first film layer of the amorphous alloy having the super-cooling liquid phase onto the master transfer surface of the master die.

13. The manufacturing method of claim 12, wherein the film thickness of the second function film is 0.01 —20 μm.

14. The manufacturing method claim 12, wherein the second function film contains at least one kind of substance selected from the group consisting or precious metal elements of Pt, Ir, Pd, Au, Ru, Rh and Ag, transition metal elements of Fe, Co, Ni, Cr, W, Ti, Mo and Zr, alumina, chromina, tungsten, carbide, silicon nitride, carbon nitride, TiN, TiAlN, zirconia, diamond, diamond-like carbon and carbon.

15. The manufacturing method of claim 14, wherein the second function film contains at least one kind of element selected from the group consisting of the precious metal elements of Pt, Ir, Pd, Au, Ru, Rh and Ag and the transition metal elements of Fe, Co, Ni, Cr, W, Ti, Mo and Zr.

16. The manufacturing method of claim 12, wherein the second function film contains at least one kind of raw material selected from the group consisting of alumina, chromina, tungsten carbide, silicon nitride, carbon nitride, TiN, TiAlN, zirconia, diamond, diamond-like carbon and carbon.

17. The manufacturing method of claim 7, wherein the first function film is formed by a vapor deposition method.

18. The manufacturing method of claim 17, wherein the first function film is formed by a chemical vapor deposition method.

19. The manufacturing method of claim 17, wherein the first function film is formed by a physical vapor deposition method.

20. The manufacturing method claim 19, wherein the first function film is formed by a spattering method.

21. The manufacturing method of claim 17, wherein the first function film is formed by an ion-plating method.

22. The manufacturing method of claim 17, wherein the first function film is formed by a vacuum evaporation method.

23. The manufacturing method of claim 7, wherein the optical shape of the master transfer surface of the master die is made to be different from a shape of an optical surface of an optical element, which is formed by the molding transfer surface of the die, the molding transfer surface being formed by the master transfer surface, and wherein the difference is determined in accordance with at least one of the thickness of the first function film formed on the master transfer surface and a heat contraction of an optical element material.

24. The manufacturing method of claim 7, wherein the first function film remains on the master transfer surface after the steps of peeling the first film layer from the master die and transferring the first film layer onto the base material of the die.

25. The manufacturing method of claim 7, wherein the first function film is transferred onto the molding transfer surface of the die after the steps of peeling the first film layer from the master die and transferring the first film layer onto the base material of the die.

26. The manufacturing method of claim 25, wherein the manufacturing method further comprises removing the first function film transferred onto the molding transfer surface of the die.

27. The manufacturing method of claim 1, wherein a ring-shaped zone structure around an optical axis of the optical element is formed on an optical surface of the optical element formed by the molding transfer surface of the die.

28. The manufacturing method of claim 27, wherein the ring-shaped zone structure is an optical path difference-generating structure.

29. The manufacturing method of claim 27, wherein the ring-shaped zone structure is a blaze type diffractive structure whose sectional shape in the optical axis direction is saw-tooth shape.

30. The manufacturing method of claim 27, wherein the ring-shaped zone structure is the diffractive structure whose sectional shape including the optical axis is step-like shape.

31. The manufacturing method of claim 27, wherein the optical element is used in an optical pickup apparatus, and the ring-shaped zone structure has a function by which an aberration change of the optical element due to a wavelength change of a light source to irradiate light onto the optical element is corrected.

32. The manufacturing method of claim 27 wherein the ring-shaped zone structure has a function by which an aberration change due to a temperature change of the optical element is corrected.

33. The manufacturing method of claim 1, wherein a plurality of protrusions or hollows are formed on the molding transfer surface of the die by a plurality of protrusions or hollows formed on the master transfer surface of the master die so that a plurality of protrusions or hollows corresponding to the protrusions or hollows on the molding transfer surface of the die are formed on an optical surface of the optical element.

34. The manufacturing method of claim 33, wherein the protrusions or hollows of the optical surface of the optical element form a minute structure of an equivalent refractive index area.

35. The manufacturing method of claim 33, wherein the protrusions or hollows of the optical surface of the optical element form a minute structure, which generates a reflection prevention effect.

36. The manufacturing method of claim 33, wherein the protrusions or hollows of the optical surface of the optical element form a minute structure, which generates a structure double refraction.

37. The manufacturing method of claim 33, wherein the protrusions or hollows of the optical surface of the optical element form the minute structure of the resonance area.

38. The manufacturing method of claim 33, wherein the protrusions or hollows on the molding transfer surface of the die are formed on a part of the molding transfer surface of the die so that the protrusions or hollows of the optical surface of the optical element are formed on a part of the optical surface.

39. The manufacturing method of claim 33, wherein the protrusions or hollows formed on the molding transfer surface of the die is formed on a part of the molding transfer surface of the die so that the protrusions or hollows of the optical surface of the optical element include at least a plurality of shapes or arrangement patterns and are formed on a part of the optical surface of the optical element.

40. The manufacturing method of claim 1, wherein the molding transfer surface of is formed of only the aspheric surface shape.

41. The manufacturing method of claim 1, wherein the first film layer is formed by a vacuum evaporation method.

42. The manufacturing method of claim 41, wherein the first film layer is formed by a chemical vapor deposition method.

43. The manufacturing method of claim 41, wherein the first film layer is formed by a physical vapor deposition method.

44. The manufacturing method of claim 43, wherein the first film layer is formed by spattering method.

45. The manufacturing method of claim 43, wherein the first film layer is formed by ion-plating method.

46. The manufacturing method of claim 43, wherein the first film layer is formed by a vacuum evaporation method.

47. The manufacturing method of claim 1, wherein the composition of the amorphous alloy having the supercooling liquid phase of the first film layer contains Pd in the rate of not smaller than 20 mol % and not larger than 90 mol %.

48. The manufacturing method of claim 47, wherein the composition of the amorphous alloy having the supercooling liquid phase of the first film layer contains at least one kind of element selected from the group consisting of Cu, Ni, Al, Si, P and B in a rate of not smaller than 1 mol %.

49. The manufacturing method of claim 1, wherein the composition of the amorphous alloy having the supercooling liquid phase of the first film layer contains Zr in the rate of not smaller than 20 mol % and not larger than 90 mol %.

50. The manufacturing method of claim 49, wherein the composition of the amorphous alloy having the supercooling liquid phase of the first film layer contains at least one kind of element selected from the group consisting of Fe, Co, Hf, Ti, Cu, Ni, Al, Sn, Si, P and B in a rate of not smaller than 1 mol %.

51. The manufacturing method of claim 1, wherein the composition of the amorphous alloy having the supercooling liquid phase of the first film layer contains Ti in the rate of not smaller than 20 mol % and not larger than 90 mol %.

52. The manufacturing method of claim 51, wherein the composition of the amorphous alloy having the supercooling liquid phase of the first film layer contains at least one kind of element selected from the group consisting of Hf, Zr, Cu, Ni, Co, Fe, Sn, Al, Si, P and B in a rate of not smaller than 1 mol %.

53. The manufacturing method of claim 1, wherein the composition of the amorphous alloy having the supercooling liquid phase of the first film layer contains Mg in the rate of not smaller than 20 mol % and not larger than 90 mol %.

54. The manufacturing method of claim 53, wherein the composition of the amorphous alloy having the supercooling liquid phase of the first film layer contains at least one kind of element selected from the group consisting of Y, Hf, Zr, Cu, Fe, Co, Ni, Al, Si, P and B in a rate of not smaller than 1 mol %.

55. The manufacturing method of claim 1, wherein the composition of the amorphous alloy having the supercooling liquid phase of the first film layer contains La in the rate of not smaller than 20 mol % and not larger than 90 mol %.

56. The manufacturing method of claim 55, wherein the composition of the amorphous alloy having the supercooling liquid phase of the first film layer contains at least one kind of element selected from the group consisting of Cu, Ni, Co, Al, Si, P, B, Hf, and Zr in a rate of not smaller than 1 mol %.

57. The manufacturing method of claim 1, wherein the composition of the amorphous alloy having the supercooling liquid phase of the first film layer contains Fe in the rate of not smaller than 20 mol % and not larger than 90 mol %.

58. The manufacturing method of claim 57, wherein the composition of the amorphous alloy having the super-cooling liquid phase of the first film layer contains at least one kind of element selected from the group consisting of Co, Ni, Hf, Zr, Ti, Cu, Ni, Al, Sn, Si, P and B in a rate of not smaller than 1 mol %.

59. The manufacturing method of claim 1, wherein the composition of the amorphous alloy having the super-cooling liquid phase of the first film layer contains Co in the rate of not smaller than 20 mol % and not larger than 90 mol %.

60. The manufacturing method of claim 59, wherein the composition of the amorphous alloy having the super-cooling liquid phase of the first film layer contains at least one kind of element selected from the group consisting of Ni, Hf, Fe, Zr, Ti, Cu, Ni, Al, Sn, Si, P and B in a rate of not smaller than 1 mol %.

61. The manufacturing method of claim 1, wherein the composition of the amorphous alloy having the super-cooling liquid phase of the first film layer contains Ni in the rate of not smaller than 20 % and not larger than 90 mol %.

62. The manufacturing method of claim 59, wherein the composition of the amorphous alloy having the super-cooling liquid phase of the first film layer contains at least one kind of element selected from the group consisting of Co, Hf, Fe, Zr, Ti, Cu, Ni, Al, Sn, Si, P and B in a rate of not smaller than 1 mol %.

63. The manufacturing method of claim 1, wherein the composition of the amorphous alloy having the super-cooling liquid phase of the first film layer contains Mo in the rate of not smaller than 20 mol % and not larger than 90 mol %.

64. The manufacturing method of claim 63, wherein the composition of the amorphous alloy having the super-cooling liquid phase of the first film layer contains at least one kind of element selected from the group consisting of Fe, Co, Ni, Cu, Hf, Zr, Ti, W, Sn, Al, Si, P, B and Pd in a rate of not smaller than 1 mol %.

65. The manufacturing method of claim 1, wherein the composition of the amorphous alloy having the super-cooling liquid phase of the first film layer contains Pt in the rate of not smaller than 20 mol % and not larger than 90 mol %.

66. The manufacturing method claim 65, wherein the composition of the amorphous alloy having the super-cooling liquid phase of the first film layer contains at least one kind of element selected from the group consisting of Fe, Co, Ni, Cu, Hf, Zr, Ti, W, Sn, Al, Si, P, B and Pd in a rate of not smaller than 1 mol %.

67. The manufacturing method of claim 1, wherein the composition of the amorphous alloy having the super-cooling liquid phase of the first film layer contains at least one kind of precious metal element selected from the group consisting of Os, Pt, Ir, Au, Ag, Rh, Pd and Ru in a rate of not smaller than 1 mol %.

* * * * *